US010829956B2

(12) United States Patent
Harris

(10) Patent No.: US 10,829,956 B2
(45) Date of Patent: Nov. 10, 2020

(54) AUTOMATIC SLIDING PANEL DEADBOLT LOCK ASSEMBLY

(71) Applicant: Schlage Lock Company LLC, Carmel, IN (US)

(72) Inventor: Richard E. Harris, Indianapolis, IN (US)

(73) Assignee: Schlage Lock Company LLC, Carmel, IN (US)

( * ) Notice: Subject to any disclaimer, the term of this patent is extended or adjusted under 35 U.S.C. 154(b) by 0 days.

(21) Appl. No.: 16/030,156

(22) Filed: Jul. 9, 2018

(65) Prior Publication Data

US 2020/0011088 A1 Jan. 9, 2020

(51) Int. Cl.
*E05B 47/00* (2006.01)
*F24F 11/32* (2018.01)
(Continued)

(52) U.S. Cl.
CPC .......... *E05B 47/0001* (2013.01); *E05B 45/06* (2013.01); *E05B 65/0864* (2013.01); *F24F 11/32* (2018.01); *G07C 9/00309* (2013.01); *E05B 2045/063* (2013.01); *E05B 2045/0665* (2013.01); *E05B 2047/0048* (2013.01); *E05B 2047/0068* (2013.01); *E05B 2047/0069* (2013.01); *E05B 2047/0095* (2013.01); *G07C 2009/00325* (2013.01)

(58) Field of Classification Search
CPC ...... F24F 11/32; E05B 45/06; E05B 65/0864; E05B 2045/063; E05B 2045/0665; E05B 2047/0048; E05B 2047/068; E05B 2047/0069; E05B 2047/0095; G07C 9/00309; G07C 2009/00325
See application file for complete search history.

(56) References Cited

U.S. PATENT DOCUMENTS

| | | | |
|---|---|---|---|
| 4,372,005 | A | 2/1983 | Inesso |
| 4,799,719 | A | 1/1989 | Wood |

(Continued)

OTHER PUBLICATIONS

International Search Report; International Searching Authority; International Application No. PCT/US2019/041035; Oct. 24, 2019; 2 pages.

(Continued)

*Primary Examiner* — Sisay Yacob
(74) *Attorney, Agent, or Firm* — Taft Stettinius & Hollister LLP

(57) ABSTRACT

A sliding panel deadbolt lock assembly that is associated with a sliding panel that transitions between an open position and a closed position relative to a stationary panel that is coupled to the sliding panel. A sliding panel lock assembly includes a pin that transitions between an engaged position and a retracted position. A first magnetic field sensing device is positioned at the retracted position of the pin when the pin is in the retracted position to enable the sliding panel to transition from the closed position. The first magnetic field sensing device detects a magnetic field generated by a first magnetic field generating device positioned on the pin. The first magnetic field sensing device positioned at the retracted position of the pin is aligned with the first magnetic field generating device positioned on the pin when the pin is in the retracted position.

17 Claims, 5 Drawing Sheets

(51) Int. Cl.
*E05B 45/06* (2006.01)
*E05B 65/08* (2006.01)
*G07C 9/00* (2006.01)

(56) References Cited

U.S. PATENT DOCUMENTS

| | | | |
|---|---|---|---|
| 5,247,763 | A | 9/1993 | Hein |
| 5,711,112 | A | 1/1998 | Barten et al. |
| 6,065,184 | A | 5/2000 | Drury |
| 6,289,643 | B1 | 9/2001 | Bonar |
| 6,490,832 | B1 | 12/2002 | Fischbach et al. |
| 7,124,469 | B2 | 10/2006 | Teskhanovsky et al. |
| 8,096,342 | B2 * | 1/2012 | Scruggs .............. E05D 15/0626 160/211 |
| 8,205,387 | B2 | 6/2012 | Ranaudo et al. |
| 8,539,717 | B2 | 9/2013 | Speyer et al. |
| 8,585,105 | B1 | 11/2013 | Dobbins, Sr. |
| 8,931,216 | B2 | 1/2015 | Gazda et al. |
| 9,024,759 | B2 | 5/2015 | Uyeda et al. |
| 9,217,272 | B2 | 12/2015 | Phillips |
| 9,702,168 | B2 | 7/2017 | Jadallah et al. |
| 2003/0053855 | A1 * | 3/2003 | Baur ...................... F16B 5/0614 403/188 |
| 2003/0164615 | A1 | 9/2003 | Ng |
| 2008/0250716 | A1 | 10/2008 | Ranaudo et al. |
| 2011/0072724 | A1 * | 3/2011 | Scruggs .............. E05D 15/0626 49/129 |
| 2011/0291846 | A1 * | 12/2011 | Burdenko ............. E05B 47/026 340/635 |
| 2011/0291848 | A1 * | 12/2011 | Burdenko ........... E05B 15/0245 340/665 |
| 2012/0229251 | A1 | 9/2012 | Ufkes |
| 2015/0330126 | A1 | 11/2015 | Ma et al. |
| 2017/0022735 | A1 | 1/2017 | Lowder |
| 2018/0223573 | A1 * | 8/2018 | Wolfe .................... E06B 3/4636 |

OTHER PUBLICATIONS

Written Opinion of the International Searching Authority; International Searching Authority; International Application No. PCT/US2019/041035; Oct. 24, 2019; 7 pages.

* cited by examiner

AUTOMATIC SLIDING PANEL DEADBOLT LOCK ASSEMBLY

BACKGROUND

Field of Disclosure

The present disclosure generally relates to door position sensing and specifically to position sensing of sliding panels.

Related Art

Conventional sliding door deadbolt lock assemblies are typically positioned in the sliding door frame at a point where an edge of the stationary panel is aligned with an edge of the sliding door when the sliding door is in the closed position. In doing so, the conventional sliding door deadbolt lock assembly has the pin transitioned into the engaged position and thereby prevents the sliding door from being moved from the closed position. In order to transition the pin into the engaged position, a user is required to bend down to the conventional sliding door deadbolt lock assembly positioned in the bottom tray of the sliding door frame and manually transition the pin into the engaged position. The user is then required to bend down again to the conventional sliding door deadbolt lock assembly and manually transition the pin into the retracted position.

The user is also required to transition the pin of the conventional sliding deadbolt lock assembly between the engaged position and the retracted position from within the structure associated with the sliding door. For example, the user is required to transition the pin of the conventional sliding deadbolt lock assembly while positioned inside the house of the sliding door. The user is unable to transition the pin of the conventional sliding deadbolt lock assembly from the engaged position to the retracted position to transition the sliding door into the open position when the user is positioned outside the house.

The user is also required to go to the conventional sliding deadbolt lock assembly as positioned in the sliding door frame of the sliding door to determine whether the pin is in the engaged position or the retracted position. The user is unable to determine the status of the pin of the conventional sliding deadbolt lock assembly from a remote location. The user is also unable to wirelessly operate the conventional sliding deadbolt lock assembly by transitioning the pin between the engaged and retracted positions remotely. Further, the conventional sliding deadbolt lock assembly is unable to be connected to a home automation system and/or alarm system such that the systems may generate an alarm when the sliding door is in the open position without authorization of the user and/or the user be informed of the status of the sliding door.

BRIEF SUMMARY

Embodiments of the present disclosure relate to automatically transitioning a pin included in a sliding deadbolt lock assembly such that that a controller may automatically transition the pin from an engaged position to a retracted position rather than having a user manually do such a transition. In an embodiment, a sliding panel lock system is associated with a sliding panel that transitions between an open position and a closed position relative to a stationary panel that is coupled to the sliding door panel. The sliding panel lock assembly includes a pin and is configured to transition between an engaged position and a retracted position. A first magnetic field sensing device is positioned at the retracted position of the pin to enable the sliding panel to transition from the closed position. The first magnetic field sensing device is configured to detect a magnetic field generated by a first magnetic field generating device positioned on the pin. The magnetic field sensing device positioned at the retracted position of the pin is aligned with the first magnetic field generating device positioned on the pin when the pin is in the retracted position to enable the sliding panel to transition from the closed position.

In an embodiment, a method transitions a sliding panel deadbolt lock assembly that is associated with a sliding panel that transitions between an open position and a closed position relative to a stationary panel that is coupled to the sliding panel. A pin that is included in the sliding panel deadbolt lock assembly is transitioned between an engaged position and a retracted position. A magnetic field generated by a first magnetic field generating device positioned on the pin is detected by a first magnetic field sensing device that is positioned at the retracted position of the pin to enable the sliding panel to transition from the closed position. The first magnetic field sensing device positioned at the retracted position of the pin is aligned with the first magnetic field generating device positioned on the pin when the pin is in the retracted position to enable the sliding panel from to transition from the closed position.

In an embodiment, a sliding panel lock assembly is associated with a sliding panel that transitions between an open position and a closed position relative to a stationary panel that is coupled to the sliding panel. A sliding panel lock assembly includes a pin and is configured to transition between an engaged position and a retracted position. A controller is configured to determine a position of the pin as to whether the pin is in the engaged position to prevent the sliding panel from transitioning from the closed position or the retracted position to enable the sliding panel to transition from the closed position to the open position. The controller is also configured to wirelessly communicate to a communications device the position of the pin as to whether the pin is in the engaged position or the retracted position.

BRIEF DESCRIPTION OF THE DRAWINGS/FIGURES

Embodiments of the present disclosure are described with reference to the accompanying drawings. In the drawings, like reference numerals indicate identical or functionally similar elements. Additionally, the left most digit(s) of a reference number identifies the drawing in which the reference number first appears.

DETAILED DESCRIPTION OF THE PRESENT DISCLOSURE

Figure 1A:
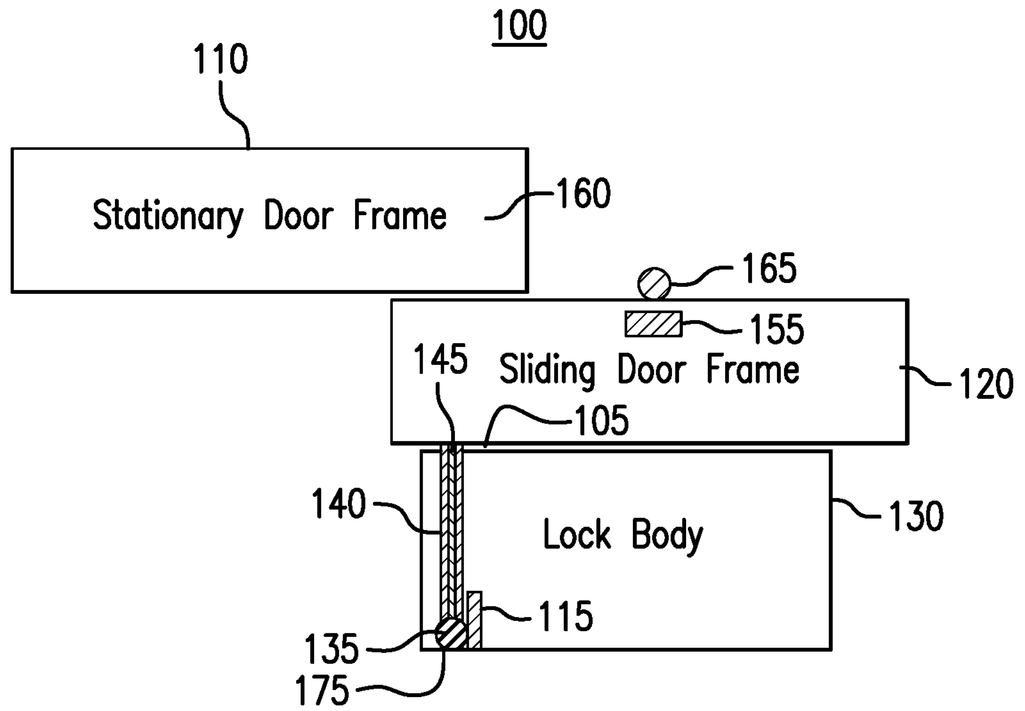
FIG. 1A is an elevational view of a sliding panel lock system that is associated with a sliding panel that is in a retracted position relative to a stationary panel that is coupled to the sliding panel.

The following Detailed Description refers to accompanying drawings to illustrate exemplary embodiments consistent with the present disclosure. References in the Detailed Description to "one exemplary embodiment," an "exemplary embodiment," an "example exemplary embodiment," etc., indicate the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic may be described in connection with an exemplary embodiment, it is within the knowledge of those skilled in the art(s) to effect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the present disclosure. Therefore, the Detailed Description is not meant to limit the present disclosure. Rather, the scope of the present disclosure is defined only in accordance with the following claims and their equivalents.

Embodiments of the present disclosure may be implemented in hardware, firmware, software, or any combination thereof. Embodiments of the present disclosure may also be implemented as instructions applied by a machine-readable medium, which may be read and executed by one or more processors. A machine-readable medium may include any mechanism for storing or transmitting information in a form readable by a machine (e.g., a computing device). For example, a machine-readable medium may include read only memory ("ROM"), random access memory ("RAM"), magnetic disk storage media, optical storage media, flash memory devices, electrical optical, acoustical or other forms of propagated signals (e.g., carrier waves, infrared signals, digital signals, etc.), and others. Further firmware, software routines, and instructions may be described herein as performing certain actions. However, it should be appreciated that such descriptions are merely for convenience and that such actions in fact result from computing devices, processors, controllers, or other devices executing the firmware, software, routines, instructions, etc.

For purposes of this discussion, each of the various components discussed may be considered a module, and the term "module" shall be understood to include at least one software, firmware, and hardware (such as one or more circuit, microchip, or device, or any combination thereof), and any combination thereof. In addition, it will be understood that each module may include one, or more than one, component within an actual device, and each component that forms a part of the described module may function either cooperatively or independently from any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will so fully reveal the general nature of the present disclosure that others can, by applying knowledge of those skilled in the relevant art(s), readily modify and/or adapt for various applications such exemplary embodiments, without undue experimentation, without departing from the spirit and scope of the present disclosure. Therefore, such adaptations and modifications are intended to be within the meaning and plurality of equivalents of the exemplary embodiments based upon the teaching and guidance presented herein. It is to be understood that the phraseology or terminology herein for the purpose of description and not of limitation, such that the terminology or phraseology of the present specification is to be interpreted by those skilled in the relevant art(s) in light of the teachings herein.

Sliding Panel Lock System

FIG. 1A is an elevational view of a sliding panel lock system 100 that is associated with a sliding panel that is in a retracted position relative to a stationary panel that is coupled to the sliding panel. The sliding panel lock system 100 includes a stationary door frame 110, a sliding door frame 120, a lock body 130, a pin 140, a first magnetic field generating device 135, a first magnetic field sensing device 115, an engaged position 160, and a retracted position 105. The sliding panel lock system 100 further includes a stationary panel (not pictured) that is positioned in the stationary door frame 110 and remains stationary in the stationary door frame 110 and a sliding panel (not pictured) that is positioned in the sliding door frame 120 and moves along the sliding door frame 120 relative to the stationary panel.

The sliding panel lock system 100 may be associated with a sliding panel that is a sliding door that is positioned in the sliding door frame 120 and moves along the sliding door frame 120 relative to a stationary door that is positioned in the stationary door frame 110. For example, the sliding panel lock system 100 may be associated with a sliding door such as a sliding glass door for a residence that enables the user to transition between inside the residence to outside the residence by sliding the glass door in the sliding door frame 120 to transition the sliding glass door from the closed position and the open position relative to the stationary glass door that remains stationary relative to the sliding glass door as positioned in the stationary door frame 110. The sliding panel lock system 100 may be associated with sliding glass doors, sliding screen doors, windows that have a sliding window that slides relative to a stationary window that remains stationary, jewelry boxes that have sliding drawers/lids that slide relative to a stationary drawer lid, sliding closets, sliding gates, display cases, cabinets that have sliding panels that slide relative to a stationary panel and/or any other sliding panel configuration that includes a panel that slides between the open position and the closed position relative to the stationary panel that will be apparent to those skilled in the relevant art(s) without departing from the spirit and scope of the disclosure.

Figure 1B:
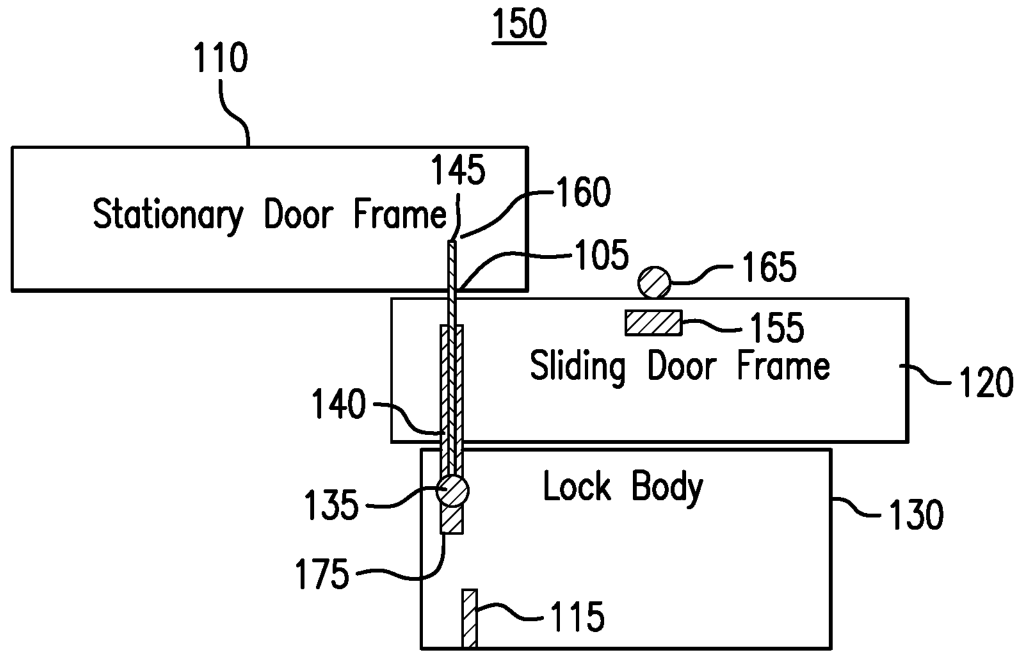
FIG. 1B is an elevational view of a sliding panel lock system that is associated with the sliding panel that is in an engaged position relative to the stationary panel that is coupled to the sliding panel.

A sliding panel lock assembly may include the pin 140 that transitions between the engaged position 160 and the retracted position 105. The sliding panel lock assembly that also includes the lock body 130, the first magnetic field generating device 135, and the first magnetic field sensing device 115 may be positioned such that the sliding panel lock assembly is coupled to the sliding door frame 120. FIG. 1B is an elevational view of a sliding panel lock system 150 that is associated with the sliding panel that is in an engaged position relative to the stationary panel that is coupled to the sliding panel. In being coupled to the sliding door frame 120, the pin 140 may transition between the retracted position 105 and the engaged position 160. The pin 140 may cause an obstruction when transitioned to the engaged position 160 such that the pin 140 moves across the sliding door frame 120 and becomes an obstruction to the sliding panel that moves along the sliding door frame 120. Any attempt to move the sliding panel along the sliding door frame 120 may hit the pin 140 positioned in the engaged position 160 and prevent the sliding panel from moving beyond the pin 140 and maintaining the sliding door frame 120 in the closed position.

In an embodiment, the pin 140 may be in the engaged position 160 when the pin 140 moves such that a second end 145 of the pin 140 is inserted into the stationary door frame 110 thereby securing the pin 140 in the stationary door frame 110 and in doing so providing an adequate obstruction to the sliding panel that is attempted to move from the closed position to the open position. The pin 140 may be in the engaged position 160 at any position that enables the pin 140 to provide an adequate obstruction to the sliding panel to thereby prevent the sliding panel from moving from the closed position to the open position that will be apparent to those skilled in the relevant art(s) without departing from the spirit and scope of the disclosure.

In an embodiment, the sliding lock panel assembly may be coupled to the bottom sliding door frame 120 and engage the bottom of the stationary door frame 110 when in the engaged position 160 to provide the obstruction to the sliding panel. The sliding lock panel assembly may be coupled to the top door frame 120 and engage the top of the stationary door frame 110 when in the engaged position 160 to provide the obstruction to the sliding panel. The sliding lock panel assembly may be coupled to any portion of the sliding panel configuration to provide an adequate obstruction to the sliding panel when the pin 140 is in the engaged position 160 to prevent the sliding panel from transitioning from the closed position to the open position that will be apparent to those skilled in the relevant art(s) without departing from the spirit and scope of the disclosure.

Returning to FIG. 1A, the pin 140 may transition from the engaged position 160 to the retracted positioned 105 such that when the pin 140 transitions to the retracted position 105, the pin 140 may no longer provide an obstruction to the sliding panel. In doing so, the sliding panel may then move freely along the sliding door frame 120 relative to the stationary frame 110 and transition from the closed position to the open position.

Figure 2:
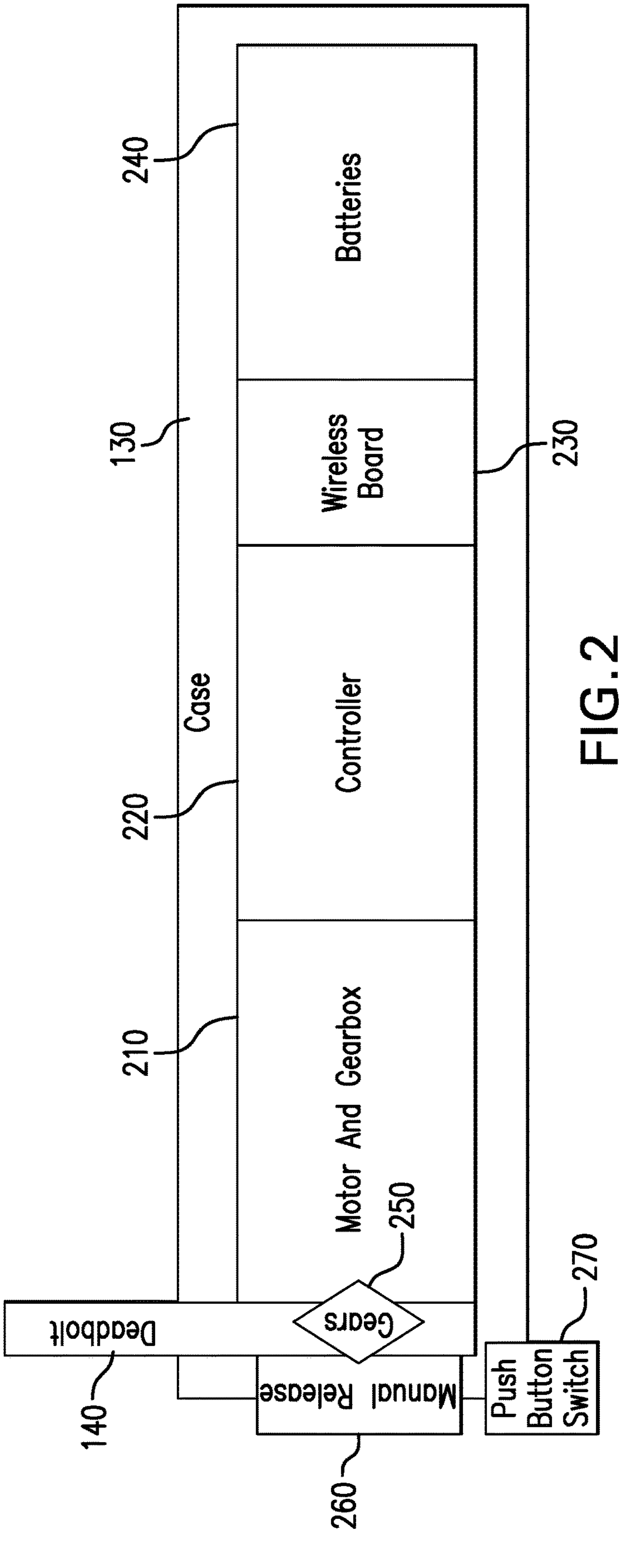
FIG. 2 is a block diagram of a sliding panel lock system that is enclosed in the lock body and is associated with the sliding panel.

FIG. 2 is a block diagram of a sliding panel lock system 200 that is enclosed in the lock body 130 and is associated with the sliding panel. The sliding panel lock system 200 includes the pin 140, the lock body 130, a motor and gearbox 210, gears 250, a controller 220, a wireless board 230, batteries 240, a push button switch 270, and a manual release 260. As the pin 140 transitions between the engaged position 160 and the retracted position 105, the motor and gearbox 210 may rotate the gears 250 such that the pin 140 moves and transitions between the engaged position 160 and the retracted position 105. The sliding panel lock system 200 may be powered by the batteries 240. The batteries 240 may include one or more lithium ion phosphate ($LiFePO_4$) and/or one or more lead acid cells. However, this example is not limiting, those skilled in the relevant art(s) may implement the batteries 240 using any other direct current (DC) source and/or other battery chemistries without departing from the scope and spirit of the present disclosure. The batteries 240 may convert chemical energy into electrical energy via an electrochemical reaction. The batteries 240 may be internal and/or external to the lock body 130 that will be apparent to those skilled in the relevant art(s) without departing from the spirit and scope of the disclosure.

The sliding panel lock system 200 also includes a controller 220 which controls the operation of the pin 140 to move the pin 140 between the engaged position 160 and the retracted position 105. The controller 220 may determine a position of the pin 140 based on a first magnetic field sensing device 115 that detects a magnetic field generated by a first magnetic field generating device 135. The first magnetic field sensing device 115 may be positioned on the sliding panel lock assembly such that the first magnetic field sensing device 115 detects the magnetic field generated by the first magnetic field generating device 135 positioned on the pin 140. The first magnetic field generating device 135 positioned on the pin 140 may enable the first magnetic field generating device 135 to be positioned on the pin 140 such that the first magnetic field generating device 135 moves relative to the pin 140 as the pin 140 transitions between the engaged position 160 and the retracted position 105. The first magnetic field generating device 135 may be a permanent magnet, an electromagnet, and/or any type of magnetic field generating device that generates a magnetic field that may be detected by the first magnetic field sensing device that will be apparent to those skilled in the relevant art(s) without departing from the spirit and scope of the disclosure.

The first magnetic field sensing device 115 may be positioned in the sliding panel lock assembly such that the first magnetic field sensing device 115 remains stationary relative to the pin 140 as the pin 140 transitions between the engaged position 160 and the retracted position 105. The first magnetic field sensing device 115 may also be positioned on the sliding panel lock assembly such that the first magnetic field sensing device 115 detects the magnetic field generated by the first magnetic field generating device 135 positioned on the pin 140 when the pin 140 is in the retracted position 105 as shown in FIG. 1A. The first magnetic field sensing device 115 may detect the magnetic field generated by the first magnetic field generating device 135 when the pin 140 is in the retracted position 105 due to the first magnetic field sensing device 115 being within a sufficient range of the first magnetic field generating device 135 to detect the magnetic field generated by the first magnetic field generating device 135 when the pin 140 is in the retracted position 105. As the pin 140 transitions from the retracted position 105 to the engaged position 160, the first magnetic field sensing device 115 may no longer be within sufficient range to detect the magnetic field generated by the first magnetic field generating device 135 and thus fails to detect the magnetic field when the pin 140 transitions from the retracted position 105 to the engaged position 160 as shown in FIG. 1B.

The controller 220 may determine the position of the pin 140 based on whether the first magnetic field sensing device 115 detects the magnetic field generated by the first magnetic field generating device 135. The first magnetic field sensing device 115 may indicate to the controller 220 that the first magnetic field sensing device 115 is detecting the magnetic field generated by the first magnetic field generating device 135. As noted above, the first magnetic field sensing device 115 may detect the magnetic field generated by the first magnetic field generating device 135 when the first magnetic field sensing device 115 is within sufficient range to detect the magnetic field. Due to the positioning of the first magnetic field sensing device 115 on the sliding panel lock assembly, the first magnetic field sensing device 115 may detect the magnetic field when the pin 140 is in the retracted position 105. Thus, the controller 220 may determine that the pin 140 is in the retracted position 105 when the first magnetic field sensing device 115 indicates that the first magnetic field sensing device 115 detects the magnetic field generated by the first magnetic field generating device 135.

The first magnetic field sensing device 115 may also indicate to the controller 220 that the first magnetic field sensing device 115 is no longer detecting the magnetic field generated by the first magnetic field generating device 135. As noted above, the first magnetic field sensing device 115 may no longer detect the magnetic field generated by the first magnetic field generating device when the first magnetic field sensing device 115 is no longer within sufficient range to detect the magnetic field. Due to the positioning of the first magnetic field sensing device 115 on the sliding panel lock assembly, the first magnetic field sensing device 115 may no longer detect the magnetic field when the pin 140 is in the engaged position 160 as shown in FIG. 1B. Thus, the controller 220 may determine that the pin 140 is in the engaged position 160 when the first magnetic field sensing device 115 indicates that the first magnetic field sensing device 115 no longer detects the magnetic field generated by the first magnetic field generating device 135. The first magnetic field sensing device 115 may be may be a magnetometer, a reed switch, a hall effect sensor, and/or any other type of magnetic field sensing device that is capable of detecting the magnetic field generated by the magnetic field generating device when the sliding panel is in the closed position that will be apparent to those skilled in the relevant art(s) without departing from the spirit and scope of the disclosure.

As noted above in an embodiment and shown in FIG. 1A and FIG. 1B, the first magnetic field sensing device 115 may be positioned on the sliding panel lock assembly such that the first magnetic field sensing device 115 is positioned such that the first magnetic field sensing device 115 may detect the magnetic field generated by the first magnetic field generating device 135 as the pin 140 moves in a lateral direction relative to the first magnetic field sensing device 115 when transitioning between the engaged position 160 and the retracted position 105. The first magnetic field generating device 135 may be positioned on the body of the pin 140 such that as the second end 145 of the pin 140 moves between the engaged position 160 and the retracted position 105 the first magnetic field generating device 135 follows on the body of the pin 140. This enables the first magnetic field sensing device 115 to detect the magnetic field generated by the first magnetic field generating device 135 when the pin 140 is in the engaged position 160 but no longer detecting the magnetic field generated by the first magnetic field generating device 135 when the pin 140 is in the retracted position 105.

In an embodiment, the first magnetic field generating device 135 may be positioned on a first end 175 of the pin 140 such that the first end of the pin 175 is opposite a second end 145 of the pin 140 that transitions between the engaged position 160 and the retracted position 105 such that the second end 145 of the pin 140 is positioned in the engaged position 160 when the pin 140 is providing an obstruction to the sliding panel. The first magnetic field sensing device 115 may be positioned in the sliding panel lock assembly such that the first magnetic field sensing device 115 is within range to detect the magnetic field generated by the first magnetic field generating device 135 as positioned on the second end 175 of the pin 140 when the pin 140 is in the retracted position 105 thereby indicating to the controller 220 that the pin 140 is in the retracted position 105. The first magnetic field sensing device 115 may also be positioned in the sliding panel lock assembly such that first magnetic field sensing device 115 is no longer within range to detect the magnetic field generated by the first magnetic field generating device 135 as positioned on the second end 175 of the pin 140 when the pin 140 is in the engaged position 160 thereby indicating to the controller 220 that the pin 140 is in the engaged position 160.

In an embodiment, the first magnetic field sensing device 115 may be positioned at the engaged position 160. The first magnetic field generating device 135 may be positioned on the second end 145 of the pin 140 such that the first magnetic field generating device 135 moves to the engaged position 160 when the second end 145 of the pin 140 moves to the engaged position 160 and the first magnetic field generating device 135 moves to the retracted position 105 when the second end 145 of the pin 140 moves to the retracted position 105. This enables the first magnetic field sensing device 115 to detect the magnetic field generated by the first magnetic field generating device 135 when the pin 140 is in the engaged position 160 but no longer detecting the magnetic field generated by the first magnetic field generating device 135 when the pin 140 is in the retracted position 105.

The first magnetic field sensing device 115 and the first magnetic field generating device 135 may be positioned anywhere in the sliding panel lock system 100 and/or 150 such that the first magnetic field sensing device 115 adequately detects the magnetic field generated by the first magnetic field generating device 135 and then no longer detects the magnetic field generated by the first magnetic field generating device 135 such that the controller 220 may adequately determine when the pin 140 is in the engaged position 160 and when the pin is in the retracted position 105 that will be apparent to those skilled in the relevant art(s) without departing from the spirit and scope of the disclosure.

Figure 3A:
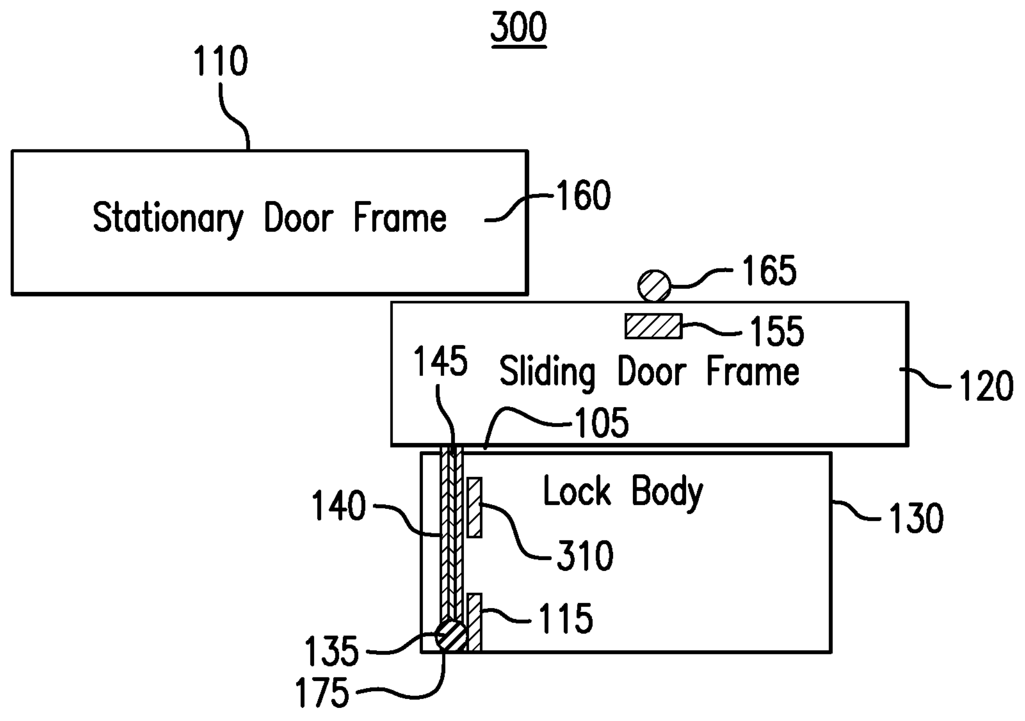
FIG. 3A is an elevational view of a sliding panel lock system that is associated with a sliding panel that is in a retracted position relative to a stationary panel that is coupled to the sliding panel.

FIG. 3A is an elevational view of a sliding panel lock system 300 that is associated with a sliding panel that is in a retracted position relative to a stationary panel that is coupled to the sliding panel. The sliding panel lock system includes the stationary door frame 110, the sliding door frame 120, the lock body 130, the pin 140, the first magnetic field generating device 135, the first magnetic field sensing device 115, the engaged position 160, the retracted position 105, and a second magnetic field sensing device 310. The sliding panel lock system 300 shares many similar features with the sliding panel lock system 100; therefore, only the differences between the sliding panel lock system 300 and the sliding panel lock system 100 are to be discussed in further detail.

The first magnetic field sensing device 115 is positioned at the retracted position 105 of the pin 140 to enable the sliding panel from transitioning from the closed position to the open position. The first magnetic field sensing device 115 detects the magnetic field generated by the first magnetic field generating device 135 positioned on the pin 140. The first magnetic field sensing device 115 positioned at the retracted position 105 of the pin 140 is aligned with the first magnetic field generating device 135 positioned on the pin 140 when the pin 140 is in the retracted position 105 to enable the sliding panel from transitioning from the closed position to the open position. As noted above, the first magnetic field sensing device 115 being positioned in the sliding panel lock assembly such that the first magnetic field sensing device 115 detects the magnetic field generated by the first magnetic field generating device 135 positioned on the pin 140 when the pin 140 is in the retracted position 105 but no longer detects the magnetic field generated by the first magnetic field generating device 135 when the pin 140 is in the engaged position 105. In addition to the first magnetic field sensing device 115, the second magnetic field sensing device 310 may detect the magnetic field generated by the first magnetic field generating device 135 when the pin 140 is in the engaged position 160 and fails to detect to the magnetic field generated by the first magnetic field generating device 135 when in the pin is in the retracted position 105.

Figure 3B:
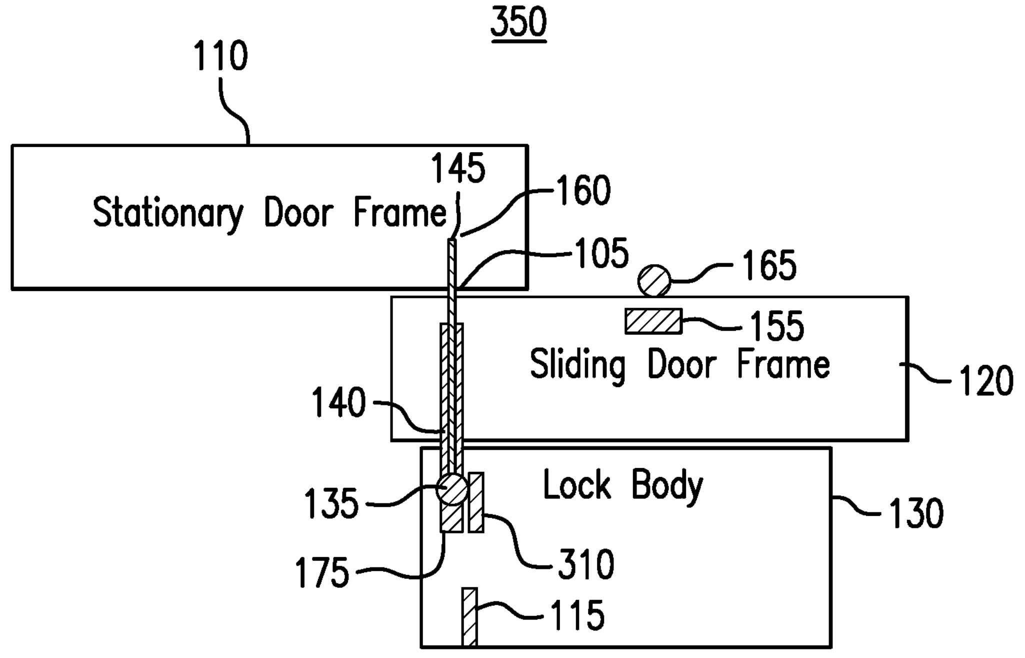
FIG. 3B is an elevational view of a sliding panel lock system that is associated with a sliding panel that is in an engaged position relative to a stationary panel that is coupled to the sliding panel.

The second magnetic field sensing device 310 may be positioned in the sliding panel lock assembly such that the second magnetic field sensing device 310 remains stationary relative to the pin 140 as the pin 140 transitions between the engaged position 160 and the retracted position 105. The second magnetic field sensing device 310 may also be positioned on the sliding panel lock assembly such that the magnetic field sensing device 310 detects the magnetic field generated by the first magnetic field generating device 135 positioned on the pin 140 when the pin 140 is in the engaged position 160 as shown in FIG. 3B. The second magnetic field sensing device 310 may detect the magnetic field generated by the first magnetic field generating device 135 when the pin 140 is in the engaged position 105 due to the second magnetic field sensing device 310 being within a sufficient range of the first magnetic field generating device 135 to detect the magnetic field generated by the first magnetic field generating device 135 when the pin 140 is in the engaged position 160. As the pin 140 transitions from the engaged position 160 to the retracted position 105, the second magnetic field sensing device 310 may no longer be within sufficient range to detect the magnetic field generated by the magnetic field generating device 135 and thus fails to detect the magnetic field when the pin 140 transitions from the engaged position 160 to the retracted position 105 as shown in FIG. 3A.

The controller 220 may determine the position of the pin 140 based on whether the second magnetic field sensing device 310 detects the magnetic field generated by the first magnetic field generating device 135. The second magnetic field sensing device 310 may indicate to the controller 220 that the second magnetic field sensing device 310 is detecting the magnetic field generated by the first magnetic field generating device 135. As noted above, the second magnetic field sensing device 310 may detect the magnetic field generated by the first magnetic field generating device 135 when the second magnetic field sensing device 310 is within sufficient range to detect the magnetic field. Due to the positioning of the second magnetic field sensing device 310 on the sliding panel lock assembly, the second magnetic field sensing device 310 may detect the magnetic field when the pin 140 is in the engaged position 160. Thus, the controller 220 may determine that the pin 140 is in the engaged position 160 when the second magnetic field sensing device 310 indicates that the second magnetic field sensing device 310 detects the magnetic field generated by the first magnetic field generating device 135. The second magnetic field sensing device 310 may be may be a magnetometer, a reed switch, a hall effect sensor, and/or any other type of magnetic field sensing device that is capable of detecting the magnetic field generated by the magnetic field generating device when the sliding panel is in the closed position that will be apparent to those skilled in the relevant art(s) without departing from the spirit and scope of the disclosure.

Thus, the combination of the first magnetic field sensing device 115 and the second magnetic field sensing device 310 may enable the controller 220 to determine that the pin 140 is in the retracted position 105 when the first magnetic field sensing device 115 detects the magnetic field generated by the first magnetic field generating device 135 and that the pin 140 is in the engaged position 160 when the second magnetic field sensing device 310 detects the magnetic field generated by the second magnetic field generating device 135. In doing so, the controller 220 may accurately determine the position of the pin 140 as to whether the pin 140 is in the engaged position 160 or the retracted position 105 based on which of the two magnetic field sensing devices are detecting the magnetic field generated by the first magnetic field sensing device 135 positioned on the pin 140.

As noted above in an embodiment and shown in FIG. 3A and FIG. 3B, the first magnetic field sensing device 115 may be positioned on the sliding panel lock assembly such that the first magnetic field sensing device 115 is positioned such that the first magnetic field sensing device 115 may detect the magnetic field generated by the first magnetic field generating device 135 as the pin 140 moves in a lateral direction relative to the first magnetic field sensing device 115 when transitioning between the engaged position 160 and the retracted position 105. The second magnetic field sensing device 310 may be positioned on the sliding panel lock assembly such that the second magnetic field sensing device 310 is positioned such that the second magnetic field sensing device 310 may detect the magnetic field generated by the second magnetic field generating device 310 as the pin 140 moves in a lateral direction relative to the second magnetic field sensing device 310 when transitioning between the engaged position 160 and the retracted position 105. The first magnetic field generating device 135 may be positioned on the body of the pin 140 such that as the second end 145 of the pin 140 moves between the engaged position 160 and the retracted position 105, the first magnetic field generating device 135 follows on the body of the pin 140. This enables the first magnetic field sensing device 115 to detect the magnetic field generated by the first magnetic field generating device 135 when the pin 140 is in the engaged position 160 and the second magnetic field sensing device 310 to detect the magnetic field generated by the first magnetic field generating device 135 when the pin 140 is in the retracted position 105.

The first magnetic field sensing device 115, the second magnetic field sensing device 310 and the first magnetic field generating device 135 may be positioned anywhere in the sliding panel lock system 300 and/or 350 such that the first magnetic field sensing device 115 adequately detects the magnetic field generated by the first magnetic field generating device 135 when the pin 140 is in the engaged position 160 and that the second magnetic field sensing device 310 adequately detects the magnetic field generated by the first magnetic field generating device 135 when the pin 140 is in the retracted position 105 such that the controller 220 may adequately determine when the pin 140 is in the engaged position 160 and when the pin is in the retracted position 105 that will be apparent to those skilled in the relevant art(s) without departing from the spirit and scope of the disclosure.

The sliding panel lock systems 100, 150, 300, and 350 as depicted in FIGS. 1A, 1B, 3A, and 3B also include a second magnetic field generating device 165 and a third magnetic field sensing device 155. The third magnetic field sensing device 155 is positioned at the sliding panel deadbolt lock assembly. The third magnetic field sensing device 155 detects the second magnetic field generating device 165 positioned on the sliding panel. The third magnetic field sensing device 155 positioned at the sliding panel deadbolt lock assembly is aligned with the second magnetic field generating device 165 positioned on the sliding panel when the sliding panel is in the closed position to enable the pin 140 to be transitioned to the engaged position 160 to prevent the sliding panel from transitioning from the closed position. The third magnetic field sensing device 155 and the second magnetic field generating device 165 may identify the position of the sliding panel with respect to whether the sliding panel is in the open position or the closed position. The controller 220 may then determine whether the pin 140 may be transitioned into the engaged position 160 based on whether the sliding panel is in the open position or the closed position.

The third magnetic field sensing device 155 may be positioned in the sliding panel lock assembly such that the third magnetic field sensing device 155 remains stationary relative to the sliding panel as the sliding panel transitions between the open position and the closed position. The third magnetic field sensing device 155 may also be positioned on the sliding panel lock assembly such that the third magnetic field sensing device 155 detects the magnetic field generated by the by the second magnetic field generating device 165 positioned on the sliding panel when the sliding panel is in the closed position. The third magnetic field sensing device 155 may detect the magnetic field generated by the second magnetic field generating device 165 when the sliding panel is in the closed position due to the third magnetic field sensing device 155 being within a sufficient range of the second magnetic field generating device 165 to detect the magnetic field generated by the second magnetic field generating device 165 when the sliding panel is in the closed position. As the sliding panel transitions from the closed position to the open position, the third magnetic field sensing device 155 may no longer be within sufficient range to detect the magnetic field generated by the second magnetic field generating device 165 and thus fails to detect the magnetic field when the sliding panel transitions from the closed position to the open position.

The controller 220 indicates that the sliding panel is in the closed position and that the pin 140 is able to be transitioned to the engaged position 160 when the third magnetic field sensing device 155 positioned at the sliding panel deadbolt lock assembly is aligned with the second magnetic field generating device 165 positioned on the sliding panel when the sliding panel is in the closed position. The controller 220 indicates that the sliding panel is in the open position and that the pin 140 is not able to be transitioned to the engaged position 160 when the third magnetic field sensing device 155 positioned at the sliding panel deadbolt lock assembly is not aligned with the second magnetic field generating device 165 positioned on the sliding panel when the sliding panel is in the open position. Thus, in addition to the controller 220 determining whether the pin 140 is in the engaged position 160 or the retracted position 105, the controller 220 may determine whether the pin 140 may even be transitioned into the engaged position 160 based on whether the third magnetic field sensing device 155 indicates the sliding panel is in the closed position or the open position. The controller 220 cannot transition the pin 140 into the engaged position 160 when the sliding panel is in the open position due to the sliding panel obstructing the transition of the pin 140 into the engaged position 160.

The third magnetic field sensing device 155 may be positioned at the sliding panel deadbolt lock assembly and the second magnetic field generating device 165 may be positioned on the sliding door frame 120 such that the third magnetic field sensing device 155 detects the magnetic field generated by the second magnetic field generating device 165 when the sliding panel is in the closed position. The third magnetic field sensing device 155 may also be positioned on the stationary door frame 110 and the second magnetic field generating device 165 may be positioned on the sliding panel such that the third magnetic field sensing device 155 detects the magnetic field generated by the second magnetic field generating device 165 when sliding panel is in the closed position. Further, the third magnetic field sensing device 155 may be positioned on the sliding door frame 120 and the second magnetic field generating device 165 may be positioned at the sliding panel deadbolt lock assembly and/or the stationary door frame 110 such that the third magnetic field sensing device 155 detects the magnetic field generated by the second magnetic field generating device 165 when the sliding panel is in the closed position. The third magnetic field sensing device 155 and the second magnetic field generating device 165 may be positioned in any manner relative to each other such that the third magnetic field sensing device 155 detects the magnetic field generated by the second magnetic field generating device 165 when the sliding panel is in the closed position that will be apparent to those skilled in the relevant art(s) without departing from the spirit and scope of the disclosure.

The sliding panel lock system 200 as depicted in FIG. 2 also includes a manual release 260. The manual release 260 may enable the user to manually transition the pin 140 between the engaged position 160 and the retracted position 105 when the controller 220 is unable to automatically transition the pin 140 between the engaged position 160 and the retracted position 105. The manual release 260 may enable the user to continue to transition the pin 140 between the engaged position 160 and the retracted position 105 despite the controller 220 malfunctioning and/or the batteries 240 have expired thereby no longer providing sufficient power to the controller 220 and/or the motor and gearbox 210 to transition the pin 140 between the engaged position 160 and the retracted position 105.

The sliding panel lock system 200 as depicted in FIG. 2 also includes a push button 270. The push button 270 may enable the user to instruct the controller 220 to transition the pin 140 between the engaged position 160 and the retracted position 105. The push button 270 may instruct the controller 220 to transition the pin 140 from the current position of the pin 140 to the opposite position. For example, the user may engage the push button 270 such that the push button 270 instructs the controller 220 to transition the pin 140 from the retracted position 105 to the engaged position 160 when the pin is in the retracted position 105. In another example, the user may engage the push button 270 such that the push button 270 instructs the controller 220 to transition the pin 140 from the engaged position 160 to the retracted position 105 when the pin is in the engaged position 160.

Wireless Control of the Sliding Panel Lock System

Figure 4:
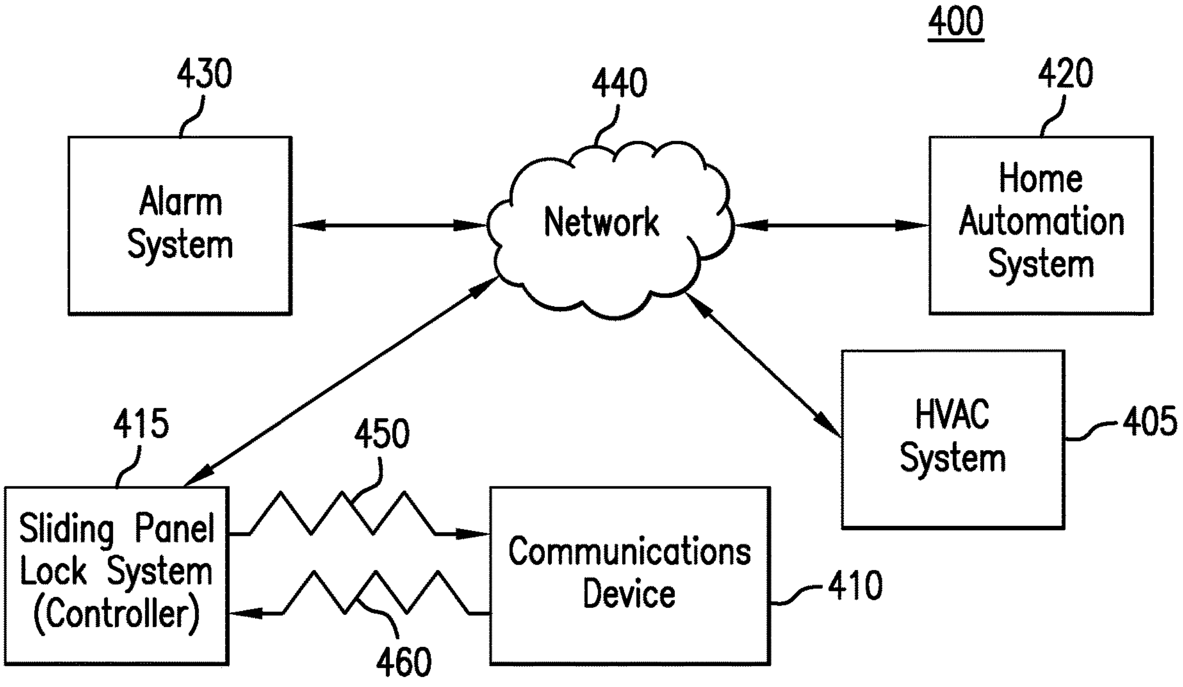
FIG. 4 illustrates a block diagram of an exemplary sliding panel lock configuration that incorporates the sliding panel lock systems illustrated in FIGS. 1A, 1B, 2, 3A, and 3B.

FIG. 4 illustrates a block diagram of an exemplary sliding panel lock configuration that incorporates the sliding panel lock systems discussed in detail above. For example, the sliding panel lock configuration 400 may incorporate the sliding panel lock systems 100, 150, 200, 300, and 350 into the sliding panel lock system 415 which incorporates the controller 220 for the sliding panel lock system 415. The sliding panel lock system 415 may wirelessly communicate with a communications device 410 such that the communications device 410 may instruct the controller 220 of the sliding panel lock system 415 as to how to transition the pin 140 of the sliding panel lock system 415. In doing so, the communications device 410 may control one or more components of the sliding panel lock system 415. For example, the communications device 410 may instruct the controller 220 via wireless communication as to transition the pin 140 into the engaged position 160 when the sliding panel is to be locked in the closed position and when the pin 140 is to retract when the sliding panel is to be unlocked and provided the ability to transition to the open position.

The controller 220 of the sliding panel lock system 415 may wirelessly communicate to the communications device 410 as to whether the pin 140 is positioned at the engaged position 160 to indicate that the sliding panel is prevented from transitioning from the closed position or when the pin 140 is positioned at the retracted position 105 to indicate that the sliding panel is enabled to transition from the closed position to the open position. As discussed in detail above, the controller 220 of the sliding panel lock system 415 may determine the position of the pin 140 as to whether the pin 140 is in the engaged position 160 or the retracted position 105 as well as whether the sliding panel is in the open position and/or the closed position based on the magnetic field sensing devices 115, 310, 155 and the magnetic field generating devices 160 and 135. The controller 220 may then provide the status of the pin 140 as well as the sliding panel to the communications device 410 via the wireless communication 450. The communications device 410 may then instruct the controller 220 via the wireless communication 460 to transition the pin 140 into the engaged position 160 or the retracted position 105 based on the status of the pin 140 and the sliding panel as provided by the controller 220.

The controller 220 of the sliding panel lock system 415 transitions the pin 140 from the retracted position 105 to the engaged position 160 to prevent the sliding panel from transitioning from the closed position when wirelessly instructed via the wireless communication 460 by the communications device 410. The controller 220 may provide to the communications device 410 via the wireless communication 450 the status of the pin 140 as to that the pin 140 is in the retracted position 105 and that the sliding panel is in the closed position and thus the sliding panel is in a position for the pin 140 to be transitioned from the retracted position 105 to the engaged position 160. The communications device 410 may display to the user the status of the pin 140 in that the pin is in the retracted position 105 and the status of the sliding panel is in the closed position. The user may request to lock the sliding panel and based on the status of the pin 140 being in the retracted position 105 and the sliding panel being in the closed position as provided by the controller 220, the user may request to transition the pin 140 from the retracted position 105 to the engaged position 160 to prevent the sliding panel from transitioning from the closed position. The communications device 410 may then instruct the controller 220 via the wireless communication 460 to transition the pin 140 from the retracted position 105 to the engaged position 160 thereby preventing the sliding panel from transitioning from the closed position and locking the sliding panel.

The controller 220 of the sliding panel lock system 415 transitions the pin 140 from the engaged position 160 to the retracted position 105 thereby enabling the sliding panel to transition from the closed position to the open position when wirelessly instructed via wireless communication 460 by the communications device 410. The controller 220 may provide to the communications device 410 via the wireless communication 450 the status of the pin 140 as to that the pin 140 is in the engaged position 160 and thus the sliding panel is in a position for the pin 140 to be transitioned from the engaged position 160 to the retracted position 105. The communications device 410 may display to the user the status of the pin 140 in that the pin 140 is in the engaged position 160. The user may request to unlock the sliding panel and based on the status of the pin 140 being in the engaged position 160 as provided by the controller 220, the user may request to transition the pin 140 from the engaged position 160 to the retracted position 105 to enable the sliding panel to transition from the closed position to the open position. The communications device 410 may then instruct the controller 220 via the wireless communication 460 to transition the pin 140 from the engaged position 160 to the retracted position 105 thereby enabling the sliding panel to transition from the closed position to the open position and unlocking the sliding panel. Thus, the user may operate the pin 140 remotely via the communications device 410 without having to travel to the sliding panel lock system 415, bend down and check the status of the pin 140, and then manually transition the pin 140 if necessary. Rather, the user may operate the pin 140 remotely from anywhere that the communications device 410 is able to be in wireless communication 450 and 460 with the controller 220.

The controller 220 may be a computing device in that multiple modules may be implemented on the same computing device. Such a computing device may include software, firmware, hardware or a combination thereof. Software may include one or more applications on an operating system. Hardware can include, but is not limited to, a processor, a memory, and/or graphical user interface display. Examples of the communications device 410 may include a mobile telephone, a smartphone, a workstation, a portable computing device, other computing devices such as a laptop, or a desktop computer, cluster of computers, set-top box, and/or any other suitable electronic device that will be apparent to those skilled in the relevant art(s) without departing from the spirit and scope of the disclosure. The wireless board 230 may enable the controller 220 to engage in the wireless communication 450 and 460 with the communications device and may include but is not limited to Bluetooth, BLE, Zigbee, Z-wave, Wi-Fi, XBee, 315 MHz, 433 MHz, 868 MHz, 915 MHz, 2.4 GHz, and/or any other Radio Frequency (RF) module that that will be apparent to those skilled in the relevant art(s) without departing from the spirit and scope of the disclosure. In an embodiment, the wireless board 230 may enable the controller 220 to engage in the wireless communication 450 and 460 when the components that controller 220 is engaging in communication with are located indoors and/or within range of the wireless communication 450 and 460 of the wireless board 230.

The controller 220 may also provide sliding panel data to the communications device 410 that includes sliding panel data that is in addition to whether the pin 140 is in the engaged position 160 or the retracted position 105 as well as whether the sliding panel is in the open position or closed position. The sliding panel data may be data associated with the sliding panel and/or the pin 140 that provides additional information to the user that is in addition to the position of the pin 140 and the position of the sliding panel. Rather the sliding panel data may provide additional insight as to the pin 140 and/or the sliding panel that may assist the user in handling the pin 140 and/or the sliding panel. The sliding panel data includes any type of information regarding the pin 140 and/or the sliding panel that may provide insight as to the pin 140 and/or the sliding panel that will be apparent to those skilled in the relevant art(s) without departing from the spirit and scope of the disclosure.

For example, the controller 220 of the sliding panel lock system 415 may wirelessly communicate to the communications device 410 via the wireless communication 450 when the sliding panel is in the open position for a period of time that exceeds an open position threshold. The open position threshold is a period of time that is indicative that the user is to be alerted that the sliding panel is in the open position for the period of time that exceeds the open position threshold. As discussed in detail above, the controller 220 may determine whether the sliding panel is in the open position or the closed position and provide that status to the communications device 410. In addition to providing the status as to the open position or the closed position, the controller 220 may also provide the period of time that the sliding panel has remained in the open position. After the sliding panel has remained in the open position for the period of time that exceeds the open position threshold, the likelihood may increase that the sliding panel has remained in the open position to the extent that an individual may have mistakenly left the sliding panel in the open position. Rather than simply allow the sliding panel to remain in the open position until an individual realizes that the sliding panel is to be transitioned into the closed position, the controller 220 may wirelessly communicate 450 to the communications device 410 that the sliding panel has remained in the open position for the period of time that exceeds the open position threshold and that the user should be notified of such via the communications device 410.

In addition to providing the status of the pin 140 and/or the sliding panel as well as sliding panel data to the communications device, the controller 220 of the sliding panel lock system 415 may also provide the status of the pin 140 and/or the sliding panel as well as the sliding panel data to other systems external to the sliding panel lock system 415 that may be able to take action regarding the pin 140 and/or the sliding panel. For example, the controller 220 may wirelessly communicate to an alarm system 430 associated with the sliding panel that the sliding panel is transitioned from the closed position to the open position without authorization from the user and to request that an alarm system 430 generate an alert associated with the sliding panel being transitioned from the closed position to the open position without authorization of the user. The controller 220 may determine that the sliding panel has transitioned from the closed position to the open position. The controller 220 may also determine that the sliding panel did so without authorization from the user based on the user failing to communicate to the controller 220 via the communications device 410 that the user requested to transition the sliding panel from the closed position to the open position. The controller 220 may then wirelessly communicate that the sliding panel transitioned from the closed position to the open position without user authorization to the alarm system 430. The alarm system 430 may then determine whether an alert should be generated based on the sliding panel transitioning from the closed position to the open position without user authorization.

In another example, the controller 220 of the sliding panel lock system 415 may wirelessly communicate to a Heating Venting and Air Conditioning (HVAC) system 405 associated with the sliding panel that the sliding panel is in the open position for a period of time that exceeds a HVAC position threshold. The HVAC position threshold is a period of time that is indicative that the heating or AC associated with the sliding panel is to be adjusted to prevent unnecessary heating or AC to be generated to accommodate the sliding panel being in the open position for the period of time that exceeds the HVAC position threshold. The controller 220 may determine that the sliding panel has transitioned from the closed position to the open position. The controller 220 may also determine that the sliding panel has remained in the open position for a significant amount of time indicating that there is an increased likelihood that either heat or AC is unnecessarily escaping from the sliding panel being in the open position.

After the sliding panel has remained in the open position for a period of time that exceeds the HVAC position threshold, the likelihood that the HVAC system 405 may activate to begin increasing the amount of heat or AC provided by the HVAC system 405 to accommodate for the amount of heat or AC unnecessarily escaping from the sliding panel being in the open position significantly increases. The HVAC system 405 may then continue to unnecessarily provide an increased amount of heat or AC as long as the sliding panel remains in the open position. Rather, the controller 220 may notify the HVAC system 405 that sliding panel has remained in the open position for a period of time that exceeds the HVAC position threshold indicating to the HVAC system 405 that the HVAC system 405 should not increase the amount of heat or AC due to the fluctuation in the heat or AC being caused by the sliding panel remaining in the open position.

In another example, the controller 220 of the sliding panel lock system 415 may wirelessly communicate the status of the pin 140 and the sliding panel as well as any sliding panel data to a home automation system 420. The home automation system 420 may be a system that enables the user to monitor the status, control, and/or operate any electronic device associated with the home automation system 420 based on data provided to the home automation system 420 by each of the electronic devices. For example, each of the locks included in a residence of the user may be wirelessly connected to the home automation system and may provide the home automation system the status of each of the locks as well as additional data associated with each of the locks and the areas that each of the locks control access. The user may then via the home automation system 420 monitor the status of each of the locks and associated areas as well as execute actions associated with the locks via the home automation system 420 based on the data provided to the user via the home automation system 420. In such an example, the user may also monitor the status of the pin 140 and the sliding panel as well as operate the pin 140 and execute other actions associated with the pin 140 and the sliding panel as discussed in detail above via the home automation system 420.

The controller 220 of the sliding panel lock system 415 may wirelessly communicate the status of the pin 140 and the sliding panel as well as additional sliding panel data such that the user and/or other external systems may monitor and/or execute actions associated with the pin 140 and the sliding panel that include but are not limited to the communications device 410, the alarm system 430, the home automation system 420, the HVAC system 405 and/or any other external system that may monitor and/or execute actions associated with the pin 140 and the sliding panel that will be apparent to those skilled in the relevant art(s) without departing from the spirit and scope of the disclosure.

As shown, the controller 220 of the sliding panel lock system 415 may wirelessly communicate with the communications device 410, the alarm system 430, HVAC system 405, and/or the home automation system 420 via wireless communication such as RF communication and/or via network 440. Network 440 includes one or more networks, such as the Internet. In some embodiments of the present disclosure, network 440 may include one or more wide area networks (WAN) or local area networks (LAN). Network 440 may utilize one or more network technologies such as Ethernet, Fast Ethernet, Gigabit Ethernet, virtual private network (VPN), remote VPN access, a variant of IEEE 802.11 standard such as Wi-Fi, and the like.

Communication over network 440 takes place using one or more network communication protocols including reliable streaming protocols such as transmission control protocol (TCP). In an embodiment, the controller 220 may wirelessly communicate with components via the network 440 when the components are positioned outdoors and/or outside of the wireless communication 450 and 460 range of the wireless board 230.

The sliding panel lock system 415 may also control for the sliding panel by incorporating but not limited to door closers, door operators, auto-operators, credential readers, hotspot readers, electronic locks including mortise, cylindrical, and/or tabular locks, exit devices, panic bars, wireless reader interfaces, gateway devices, plug-in devices, peripheral devices, doorbell camera systems, door closer control surveillance systems and/or any other type of access control device that regulates access control to a space that will be apparent to those skilled in the relevant art(s) without departing from the spirit and scope of the disclosure.

The sliding panel lock system 415 when operating as the controller of the access of the sliding panel may control one or more components as the sliding panel lock system 415 operates such as but not limited to, extending/retracting a door latch, engaging/disengaging a dogging mechanism on an exit device, opening/closing a door via a door closer/operator, moving a primer mover, controlling an electric motor, and/or any other type of action that enables the sliding panel lock system 415 to regulate the opening and/or closing of the sliding panel that provides access to a space that will be apparent to those skilled in the relevant art(s) without departing from the spirit and scope of the disclosure.

The controller 220 of the sliding panel lock system 415 may receive data from any type of component that may provide data to the controller 220 of the sliding panel lock system 415 to adequately regulate how the sliding panel transitions between the open position and/or the closed position to provide access to the space.

For example, sensors included in a locking mechanism may send data to the controller 220 of the sliding panel lock system 415 indicating that a person has departed from the sliding panel after the sliding panel closed behind the person. The controller 220 of the sliding panel lock system 415 may then instruct the pin 140 to extend into the engaged position 460 thereby locking the sliding panel. The controller 220 of the sliding panel lock system 415 may receive data from any type of component that includes but is not limited to sensors, credential readers, biometric sensing devices, user interface devices, and/or any other component that may provide data to the controller 220 of the sliding panel lock system 415 to adequately instruct the pin 140 to execute actions to regulate the sliding panel that will be apparent to those skilled in the relevant art(s) without departing from the spirit and scope of the disclosure.

System Overview

Figure 5:
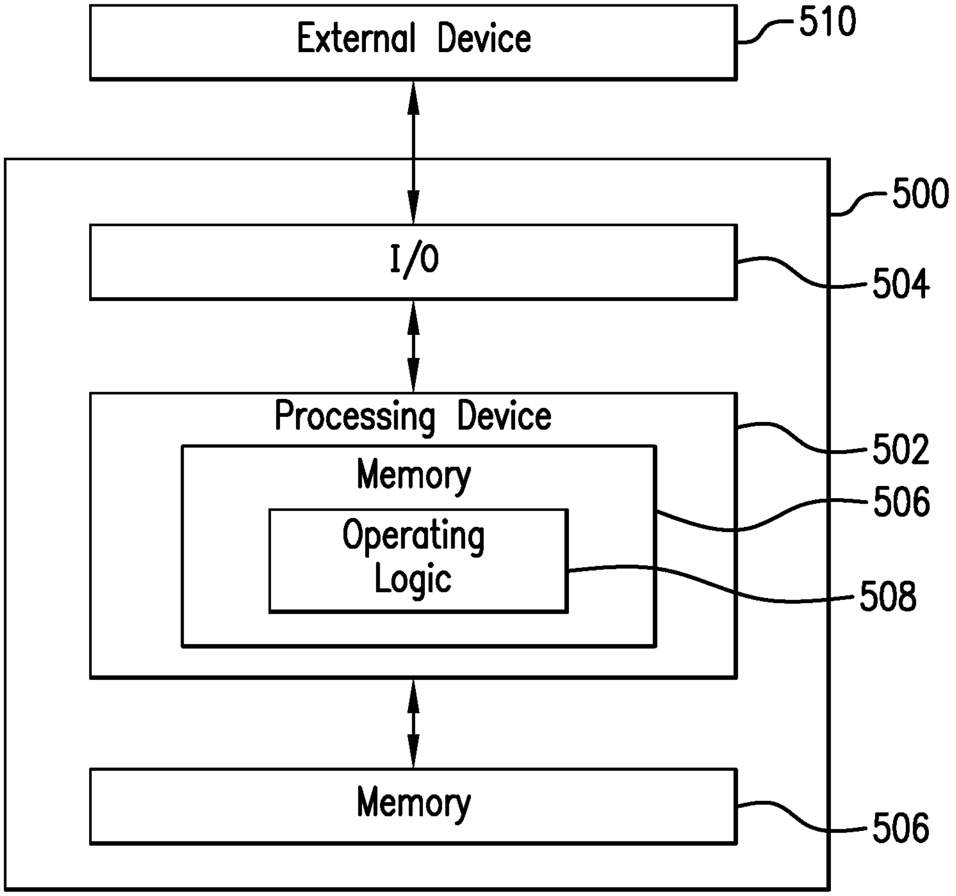
FIG. 5 illustrates a block diagram of an exemplary controller that is incorporated into the sliding panel lock systems.

Referring now to FIG. 5, a simplified block diagram of at least one embodiment of a computing device 500 is shown. The illustrative computing device 500 depicts at least one embodiment of a controller 220 for the sliding panel lock system 200 illustrated in FIG. 2. Depending on the particular embodiment, computing device 500 may be embodied as a reader device, credential device, door control device, access control device, server, desktop computer, laptop computer, tablet computer, notebook, netbook, Ultrabook™, mobile computing device, cellular phone, smartphone, wearable computing device, personal digital assistant, Internet of Things (IoT) device, control panel, processing system, router, gateway, and/or any other computing, processing, and/or communications device capable of performing the functions described herein.

The computing device 500 includes a processing device 502 that executes algorithms and/or processes data in accordance with operating logic 508, an input/output device 504 that enables communication between the computing device 500 and one or more external devices 510, and memory 506 which stores, for example, data received from the external device 510 via the input/output device 504.

The input/output device 504 allows the computing device 500 to communicate with the external device 510. For example, the input/output device 504 may include a transceiver, a network adapter, a network card, an interface, one or more communication ports (e.g., a USB port, serial port, parallel port, an analog port, a digital port, VGA, DVI, HDMI, FireWire, CAT 5, or any other type of communication port or interface), and/or other communication circuitry. Communication circuitry may be configured to use any one or more communication technologies (e.g., wireless or wired communications) and associated protocols (e.g., Ethernet, Bluetooth®, Wi-Fi®, WiMAX, etc.) to effect such communication depending on the particular computing device 500. The input/output device 504 may include hardware, software, and/or firmware suitable for performing the techniques described herein.

The external device 510 may be any type of device that allows data to be inputted or outputted from the computing device 500. For example, in various embodiments, the external device 410 may be embodied as controller 220 in the sliding panel lock system 200. Further, in some embodiments, the external device 510 may be embodied as another computing device, switch, diagnostic tool, controller, printer, display, alarm, peripheral device (e.g., keyboard, mouse, touch screen display, etc.), and/or any other computing, processing, and/or communications device capable of performing the functions described herein. Furthermore, in some embodiments, it should be appreciated that the external device 510 may be integrated into the computing device 500.

The processing device 502 may be embodied as any type of processor(s) capable of performing the functions described herein. In particular, the processing device 502 may be embodied as one or more single or multi-core processors, microcontrollers, or other processor or processing/controlling circuits. For example, in some embodiments, the processing device 502 may include or be embodied as an arithmetic logic unit (ALU), central processing unit (CPU), digital signal processor (DSP), and/or another suitable processor(s). The processing device 502 may be a programmable type, a dedicated hardwired state machine, or a combination thereof. Processing devices 502 with multiple processing units may utilize distributed, pipelined, and/or parallel processing in various embodiments. Further, the processing device 502 may be dedicated to performance of just the operations described herein, or may be utilized in one or more additional applications. In the illustrative embodiment, the processing device 502 is of a programmable variety that executes algorithms and/or processes data in accordance with operating logic 508 as defined by programming instructions (such as software or firmware) stored in memory 506. Additionally or alternatively, the operating logic 508 for processing device 502 may be at least partially defined by hardwired logic or other hardware. Further, the processing device 502 may include one or more components of any type suitable to process the signals received from input/output device 504 or from other components or devices and to provide desired output signals. Such components may include digital circuitry, analog circuitry, or a combination thereof.

The memory 506 may be of one or more types of non-transitory computer-readable media, such as a solid-state memory, electromagnetic memory, optical memory, or a combination thereof. Furthermore, the memory 506 may be volatile and/or nonvolatile and, in some embodiments, some or all of the memory 506 may be of a portable variety, such as a disk, tape, memory stick, cartridge, and/or other suitable portable memory. In operation, the memory 506 may store various data and software used during operation of the computing device 500 such as operating systems, applications, programs, libraries, and drivers. It should be appreciated that the memory 506 may store data that is manipulated by the operating logic 508 of processing device 502, such as, for example, data representative of signals received from and/or sent to the input/output device 504 in addition to or in lieu of storing programming instructions defining operating logic 508. As shown in FIG. 5, the memory 506 may be included with the processing device 502 and/or coupled to the processing device 502 depending on the particular embodiment. For example, in some embodiments, the processing device 502, the memory 506, and/or other components of the computing device 500 may form a portion of a system-on-a-chip (SoC) and be incorporated on a single integrated circuit chip.

In some embodiments, various components of the computing device 500 (e.g., the processing device 502 and the memory 506) may be communicatively coupled via an input/output subsystem, which may be embodied as circuitry and/or components to facilitate input/output operations with the processing device 502, the memory 506, and other components of the computing device 500. For example, the input/output subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The computing device 500 may include other or additional components, such as those commonly found in a typical computing device (e.g., various input/output devices and/or other components), in other embodiments. It should be further appreciated that one or more of the components of the computing device 500 described herein may be distributed across multiple computing devices. In other words, the techniques described herein may be employed by a computing system that includes one or more computing devices. Additionally, although only a single processing device 502, I/O device 504, and memory 506 are illustratively shown in FIG. 5, it should be appreciated that a particular computing device 500 may include multiple processing devices 502, I/O devices 504, and/or memories 506 in other embodiments. Further, in some embodiments, more than one external device 510 may be in communication with the computing device 500.

CONCLUSION

It is to be appreciated that the Detailed Description section, and not the Abstract section, is intended to be used to interpret the claims. The Abstract section may set forth one or more, but not all exemplary embodiments, of the present disclosure, and thus, are not intended to limit the present disclosure and the appended claims in any way.

The present disclosure has not been described above with the aid of functional building blocks illustrating the implementation of specified functions and relationships thereof. The boundaries of these functional building blocks have been arbitrarily defined herein for the convenience of the description. Alternate boundaries may be defined as long as the specified functions and relationships are appropriately performed.

It will be apparent to those skilled in the relevant art(s) that various changes in form and in detail can be made without departing from the spirit and scope of the present disclosure. Thus the present disclosure should not be limited by any of the above-described exemplary embodiments, but should be defined only in accordance with the following claims and their equivalents.

What is claimed is:

1. A sliding panel lock system that is associated with a sliding panel that transitions between an open position and a closed position relative to a stationary panel that is coupled to the sliding panel, comprising:

a sliding panel lock assembly that is positioned to insert a pin through a sliding door frame to terminate into the stationary panel and is configured to transition between an engaged position when the pin is inserted through the sliding door frame to terminate into the stationary panel to transition the sliding panel into a locked state and a retracted position when the pin is withdrawn from the stationary panel and the sliding door frame to transition the sliding panel into an unlocked state;

a first magnetic field sensing device that is positioned at the retracted position of the pin and is configured to detect a magnetic field generated by a first magnetic field generating device positioned on the pin, wherein the magnetic field sensing device positioned at the retracted position of the pin is aligned with the first magnetic field generating device positioned on the pin when the pin is in the retracted position to enable the sliding panel to transition from the closed position, and a controller configured to:

transition the pin from the retracted position to the engaged position to prevent the sliding panel from transitioning from the closed position when wirelessly instructed by the communications device; and transition the pin from the engaged position to the retracted position thereby enabling the sliding panel to transition from the closed position to the open position when wirelessly instructed by the communications device.

2. The sliding panel lock system of claim 1, further comprising:

a second magnetic field sensing device that is positioned at the engaged position of the pin to prevent the sliding panel from transitioning from the closed position to the open position and is configured to detect the magnetic field generated by the first magnetic field generating device positioned on the pin, wherein the second magnetic field sensing device positioned at the engaged position of the pin is aligned with the first magnetic field generating device positioned on the pin when the pin is in the engaged position to prevent the sliding panel from transitioning from the closed position to the open position.

3. The sliding panel lock system of claim 2, further comprising:

a controller configured to:

indicate that the pin is positioned at the engaged position and that the sliding panel is prevented from transitioning from the closed position when the second magnetic field sensing device positioned at the engaged position is aligned with the first magnetic field generating device positioned on the pin when the pin is inserted into a sliding panel frame associated with the sliding panel thereby preventing the sliding panel from transitioning from the closed position; and indicate that the pin is positioned at the retracted position when the first magnetic field sensing device positioned at the retracted position is aligned with the first magnetic field generating device positioned on the pin when the pin is not inserted into the sliding panel frame associated with the sliding panel thereby enabling the sliding panel to transition from the closed position to the open position.

4. The sliding panel lock system of claim 3, wherein the controller is further configured to wirelessly communicate to a communications device whether the pin is positioned at the engaged position to indicate that the sliding panel is prevented from transitioning from the closed position or when the pin is positioned at the retracted position to indicate that the sliding panel is enabled to transition from the closed position to the open position.

5. The sliding panel lock system of claim 4, further comprising:

a third magnetic field sensing device that is positioned at the sliding panel deadbolt lock assembly and is configured to detect a second magnetic field generating device positioned on the sliding panel, wherein the third magnetic field sensing device positioned at the sliding panel deadbolt lock assembly is aligned with the second magnetic field generating device positioned on the sliding panel when the sliding panel is in the closed position to enable the pin to be transitioned to the engaged position to prevent the sliding panel from transitioning from the closed position.

6. The sliding panel lock system of claim 5, wherein the controller is further configured to:

indicate that the sliding panel is in the closed position and that the pin is able to be transitioned to the engaged position when the third magnetic field sensing device positioned at the sliding panel deadbolt lock assembly is aligned with the second magnetic field generating device positioned on the sliding panel when the sliding panel is in the closed position; and indicate that the sliding panel is in the open position and that the pin is not able to be transitioned to the engaged position when the third magnetic field sensing device positioned at the sliding panel deadbolt lock assembly is not aligned with the second magnetic field generating device positioned on the sliding panel when the sliding panel is in the open position.

7. A method for transitioning a sliding panel deadbolt lock assembly that is associated with a sliding panel that transitions between an open position and a closed position relative to a stationary panel that is coupled to the sliding panel, comprising:

transitioning a pin that is included in the sliding panel deadbolt lock assembly through a sliding door frame to terminate into the stationary panel into an engaged position with the stationary panel to transition the sliding panel into a locked state when wirelessly instructed by the communications device;

transitioning the pin that is included in the sliding panel deadbolt lock assembly to withdraw the pin from the stationary panel and the sliding door frame into a retracted position to transition the sliding panel into an unlocked state when wirelessly instructed by the communications device;

detecting a magnetic field generated by a first magnetic field generating device positioned on the pin by a first magnetic field sensing device that is positioned at the retracted position of the pin to enable the sliding panel to transition from the closed position;

aligning the first magnetic field sensing device positioned at the retracted position of the pin with the first magnetic field generating device positioned on the pin when the pin is in the retracted position to enable the sliding panel to transition from the closed position.

8. The method of claim 7, further comprising:

detecting the magnetic field generated by the first magnetic field generating device positioned on the pin by a second magnetic field sensing device that is positioned at the engaged position of the pin to prevent the sliding panel from transitioning from the closed position to the open position; and aligning the second magnetic field sensing device positioned at the engaged position of the pin with the first magnetic field generating device positioned on the pin when the pin is in the engaged position to prevent the sliding panel from transitioning from the closed position to the open position.

9. The method of claim 8, further comprising:

indicating, by a controller, that the pin is positioned at the engaged position and that the sliding panel is prevented from transitioning from the closed position when the second magnetic field sensing device positioned at the engaged position is aligned with the first magnetic generating device positioned on the pin when the pin is inserted into a sliding panel frame associated with the sliding panel thereby preventing the sliding panel from transitioning from the closed position; and indicating that the pin is positioned at the retracted position when the first magnetic field sensing device positioned at the retracted position is aligned with the first magnetic field generating device positioned on the pin when the pin is inserted into the sliding panel frame associated with the sliding panel thereby enabling the sliding panel to transition from the closed position to the open position.

10. The method of claim 9, further comprising:

wirelessly communicating, by the controller, to a communications device whether the pin is positioned at the engaged position to indicate that the sliding panel is prevented from transitioning from the closed position or when the pin is positioned at the retracted position to indicate that the sliding panel is enabled to transition from the closed position to the open position.

11. The method of claim 10, further comprising:

detecting a second magnetic field generating device positioned on the sliding panel by a third magnetic field sensing device that is positioned at the sliding panel deadbolt lock assembly; and aligning the third magnetic field sensing device positioned at the sliding panel deadbolt lock assembly with the second magnetic field generating device positioned on the sliding panel when the sliding panel is in the closed position to enable the pin to be transitioned to the engaged position to prevent the sliding panel from transitioning from the closed position.

12. The method of claim 11, further comprising:

indicating, by the controller, that the sliding panel is in the closed position and that the pin is able to be transitioned to the engaged position when the third magnetic field sensing device positioned at the sliding panel deadbolt lock assembly is aligned with the second magnetic field generating device positioned on the sliding panel when the sliding panel is in the closed position; and indicating that the sliding panel is in the open position and that the pin is not able to be transitioned to the engaged position when the third magnetic field sensing device positioned at the sliding panel deadbolt lock assembly is not aligned with the second magnetic field generating device positioned on the sliding panel when the sliding panel is in the open position.

13. A sliding panel lock system that is associated with a sliding panel that transitions between an open position and a closed position relative to a stationary panel that is coupled to the sliding panel, comprising:

a sliding panel lock assembly that that is positioned to insert a pin through a sliding door frame to terminate into the stationary panel and is configured to transition between an engaged position when the pin is inserted through the sliding door frame to terminate into the stationary panel to transition the sliding panel into a locked state and a retracted position when the pin is withdrawn from the stationary panel and the sliding door frame to transition the sliding panel into an unlocked state; and a controller configured to:

determine whether the pin is in the engaged position to prevent the sliding panel from transitioning from the closed position or the retracted position to enable the sliding panel to transition from the closed position to the open position, wirelessly communicate to a communications device the position of the pin as to whether the pin is in the engaged position or the retracted position, transition the pin from the retracted position to the engaged position to prevent the sliding panel from transitioning from the closed position when wirelessly instructed by the communications device, and transition the pin from the engaged position to the retracted position thereby enabling the sliding panel to transition from the closed position to the open position when wirelessly instructed by the communications device.

14. The sliding panel lock system of claim 13, wherein the controller is further configured to:

determine a position of the sliding panel as to whether the sliding panel is in the closed position thereby in a position for the pin to be transitioned from the retracted position to the engaged position to prevent the sliding panel from transitioning from the closed position or in the open position thereby not in a position for the pin to be transitioned from the retracted position to the engaged position to prevent the sliding panel from transitioning from the closed position; and wirelessly communicate to the communications device the position of the sliding panel as to whether the sliding panel is in the closed position thereby in the position for the pin to be transitioned from the retracted position to the engaged position or in the open position thereby not in the position for the pin to be transitioned from the retracted position to the engaged position.

15. The sliding panel lock system of claim 10, wherein the controller is further configured to:

wirelessly communicate to the communications device that the sliding panel is in the open position when the sliding panel is in the open position for a period of time that exceeds an open position threshold, wherein the open position threshold is a period of time that is indicative that a user is to be alerted that the sliding panel is in the open position for the period of time that exceeds the open position threshold.

16. The sliding panel lock system of claim 11, wherein the controller is further configured to:

wirelessly communicate to an alarm system associated with the sliding panel that the sliding panel is transitioned from the closed position to the open position without authorization from the user and to request that the alarm system generate an alert associated with the sliding panel being transitioned from the closed position to the open position without authorization from the user.

17. The sliding panel lock system of claim 11, wherein the controller is further configured to:

wirelessly communicate to a Heating Venting and Air Conditioning (HVAC) system associated with the sliding panel that the sliding panel is in the open position for a period of time that exceeds a HVAC position threshold, wherein the HVAC threshold is a period of time that is indicative that the heating or AC associated with the sliding panel is to be adjusted to prevent unnecessary heating or AC to being generated to accommodate the sliding panel being in the open position for the period of time that exceeds the HVAC position threshold.

* * * * *